United States Patent [19]

Schroderus et al.

[11] Patent Number: 5,907,804
[45] Date of Patent: May 25, 1999

[54] CHECKING THE IDENTIFICATION NUMBER OF A MOBILE SUBSCRIBER

[75] Inventors: Osmo Schroderus, Sumiainen; Pasi Hakala, Jyväskylä, both of Finland

[73] Assignee: Nokia Telecommunications Oy, Espoo, Finland

[21] Appl. No.: 08/754,553

[22] Filed: Nov. 21, 1996

[30] Foreign Application Priority Data

Nov. 24, 1995 [FI] Finland .................................... 955677

[51] Int. Cl.$^6$ ............................ H04Q 7/32; H04M 11/00
[52] U.S. Cl. .................... 455/411; 340/825.34; 455/550
[58] Field of Search .................................. 455/410, 411, 455/550, 551; 340/825.34

[56] References Cited

U.S. PATENT DOCUMENTS

| | | | |
|---|---|---|---|
| 4,843,385 | 6/1989 | Borras ................................ | 340/825.32 |
| 5,297,191 | 3/1994 | Gerszberg ............................... | 455/551 |
| 5,551,073 | 8/1996 | Sammarco ............................... | 455/411 |
| 5,612,682 | 3/1997 | DeLuca et al. .......................... | 455/411 |
| 5,842,124 | 11/1998 | Kenagy et al. .......................... | 455/411 |

FOREIGN PATENT DOCUMENTS

| | | |
|---|---|---|
| 470 519 | 6/1994 | Sweden . |
| 95/01695 | 1/1995 | WIPO . |

OTHER PUBLICATIONS

Farrugia et al, Smart Card Technology Applied to the future European Cellular . . . , Smart Cart 2000 1991 Elsevier Science Publishers, B.V, Jan. 1991.

Donn, Smart cards in GSM, Elektron—Feb. 1994 (South Africa).

European digital cellular telecommunications system (Phase2); Subscriber Identity Modules (SIM) Functional characteristics (GSM 02.17), European Telecommunication Standard, Final Draft pr ETS 300 509, May 1994, p. 15.

European digital cellular telecommunications system (Phase 2); Specification of the Subscriber Identity Module—Mobile Equipment (SIM–ME) interface (GSM 11.11); European Telecommunication Standard, Final Draft pr ETS 300 608, Nov. 1994, pp. 1–93.

*Primary Examiner*—Willis R. Wolfe
*Attorney, Agent, or Firm*—Pillsbury Madison & Sutro LLP

[57] ABSTRACT

The invention relates to method for checking a personal identification number (PIN) of a subscriber in a mobile equipment (500) employed in a mobile communications system (600), the mobile equipment containing a protected subscriber identity (IMSI, ITSI). The method comprises the steps of requesting (203) the user of the mobile equipment the personal identification number (PIN) of the subscriber, checking (103) the validity of the personal identification number entered by the user, repeating (109) these steps provided that the user does not enter the valid personal identification number, and, when the number of requests (203) and checks (103) of the identification number exceeds a predetermined threshold value, blocking (111) the mobile equipment. According to the invention, protection of a protected subscriber identity is released (112), thus finding out the identity of the subscriber; the subscriber identity as well as and an indication that the mobile equipment has been blocked are transmitted the mobile communications system.

10 Claims, 3 Drawing Sheets

CHECKING THE IDENTIFICATION NUMBER OF A MOBILE SUBSCRIBER

THE FIELD OF THE INVENTION

The invention relates to a method for checking the identification number of a subscriber in a mobile equipment employed in a mobile communications system, said mobile equipment containing a protected subscriber identity, the method comprising the steps of: requesting the user of the mobile equipment the identification number of the subscriber, checking the validity of the identification number entered by the user, repeating these steps provided that the user does not enter the valid identification number, and, when the number of requests and checks of the identification number exceeds a predetermined threshold value, blocking the mobile equipment.

A first embodiment of the invention relates to a radio telephone or a mobile communication system in which the subscriber identities and terminal equipments are permanently connected to each other as mobile stations. Such mobile equipments are usually subscriber-specific and they are identified with a protected subscriber identity (IMSI= International Mobile Subscriber Identity or ITSI=Individual Tetra Subscriber Identity).

A second embodiment of the invention relates to a radio telephone system in which subscribers and terminal equipments are not permanently connected together, and particularly terminal equipments and subscriber identity modules, such as SIM cards (SIM=Subscriber Identity Modules), within these networks. Such systems include, for example, cellular networks comprising phones in which a subscriber is identified by a subscriber-specific subscriber identity module provided in the phones. One example of such a cellular communication system is the GSM system (Global System for Mobile Communications). Another example is the TETRA (Trans European Trunked Radio) mobile communication system. The TETRA mobile communication system, in turn, represents an example of the PMR (Private or Professional Mobile Radio) mobile communication system. It must be noted that mobile equipments according to the first embodiment of the present invention, in which terminal equipments and subscribers are permanently connected to each other, may also operate in these mobile communications systems.

BACKGROUND OF THE INVENTION

The subscriber identity module, such as a SIM card, is subscriber-specific, which means that subscriber equipments are not confined to a specific subscriber. The subscriber identity module, such as a SIM card or a GSM card, is a smart card or a smart card which is placed in the mobile equipment and contains information required for identifying a subscriber and for encrypting radio traffic. A subscriber identity module, such as a SIM card, refers herein to a smart card that can be removed from a mobile equipment and that allows a subscriber to use the card controlled mobile equipment.

If a subscriber identity module is employed, the user need not have a mobile equipment of his own, but a subscriber identity module is all he needs. Such a subscriber identity module can be, for example, a SIM card (Subscriber Identity Module) which is, in a way, a phone card that allows the subscriber to make (and receive) calls from any mobile equipment of the system. The purpose of a SIM card, on the one hand, is to provide the mobile equipment with data identifying the user safely in a protected form, and, on the other hand, to provide services to the mobile equipment. The services include maintenance of the identification number (input, alteration, etc.), calculating an encryption key by means of user identity algorithms, and unblocking a SIM card blocked after an excessive number of entered false personal identification numbers (PIN) for example by means of a PUK code (PUK-code=Personal Unblocking Key).

As an alternative way of implementing a SIM card in hand-held phones, a so-called plug-in-SIM has been introduced. A plug-in-SIM is a coin-sized part containing the electronics of a credit card sized SIM card. It is so placed in a phone that the user is not able to replace it with ease. The phone may also have an incorporated plug-in-SIM and, in addition, a card reader. If the card reader contains a card, the phone is identified on the basis of the external card, otherwise on the basis of the incorporated plug-in-SIM. The term subscriber identity module, such as a SIM card, herein generally refers to both the plug-in-SIM and the smart card SIM unless advised to the contrary.

The general function of a SIM card is specified in the GSM recommendation 02.17, Subscriber Identity Modules, ETSI, of the GSM mobile communication system. It defines the terms associated with a SIM card and sets the requirements for the security of a SIM card, functions of the highest level, defines the tasks for the network operator and the information to be stored in a SIM card. It also specifies the minimum requirements for a SIM card of a user interface of a phone, such as a mobile equipment, concerning for example the input and change of a user's Personal Identification Number (PIN).

In addition, the GSM recommendation 11.11, SIM Application Protocol, ETSI, defines more closely the issues specified by the aforementioned GSM recommendation 02.17 by defining the protocols between a SIM card and a mobile equipment (ME=Mobile Equipment), the exact contents and lengths of the data fields of the SIM card, as well as the matters related to mechanical and electrical connections. The GSM recommendation 11.11 is a documentation on the basis of which engineers are expected to be able to provide the software and hardware implementation of a SIM interface.

A problematic situation arises in the use of mobile communications systems when a mobile equipment and/or a SIM card is lost and comes into the wrong hands. Thus, since losing the phone is not necessarily noticed immediately, the person who has stolen the mobile equipment may try breaking the PIN code of the SIM card by trying different codes. When an unauthorized user has made a sufficient number of attempts to break the PIN code, the SIM card may block itself in such a way that it cannot be activated any more by means of the PIN code only, but a PUK code for cancelling the blocking must be entered. This function alone prevents unauthorized use of the SIM card, but it does not assist in identifying or neutralizing the unauthorized user in any way.

When a mobile equipment is taken into use, identifying the mobile user is usually started by requesting the user an identification number, such as a PIN (Personal Identification Number) associated with the mobile equipment or the SIM card. The personal identification number PIN related to the user of the SIM card and the mobile equipment must thus be entered into the mobile equipment and further into the SIM card if data fields determined on a PIN encryption level are wished to be read or altered. In practice, this is done every time in connection with activating the telephone or inserting the SIM card into a card reader.

Once the valid identification number has been entered, the card will also allow reading information located within a confidential area of the card memory.

If the user enters an invalid personal identification number (PIN), the SIM returns the invalid code, and the identification number is requested again. The SIM also increments its internal error counter, which cannot be adjusted by the user in any circumstances. If the user enters three invalid identification numbers in a row, the SIM shifts into a blocked state.

A blocked card may be re-activated, depending on the implementation, with a specific PUK identification number or possibly only by means of the service measures carried out by the manufacturer. A SIM that is in the blocked state only receives an unblocking command (UNBLOCK) for a blocked SIM card. In such a case, the user enters the SIM card an unblock PUK code which is 8 digits in length. Provided that the user enters an invalid unblock PUK identification number e.g. for ten times, the SIM shifts into a permanently blocked state, from which it can be returned only by the network operator that has provided the SIM card.

A mobile equipment that operates according to the prior art—in the first embodiment of the invention—and, on the other hand, a subscriber identity module i.e. a SIM card—in the second embodiment of the invention—may prevent the use of mobile equipment or correspondingly of the subscriber identity module, that is, the SIM card in such a manner that when an unauthorized user makes a sufficient number of attempts to break the PIN code, that is, when the unauthorized user enters an invalid PIN code for a sufficient number of times, the mobile equipment or the card blocks itself so that it can no longer be reactivated only by means of the PIN code, but some other unblocking code, such as a PUK code must be entered. The mobile equipment or the subscriber identity module is thus deactivated provided that the unauthorized user knows neither the PIN code nor the PUK code (PUK=Personal Unblocking Key).

Another aspect of the matter disclosed above is the fact that the memory of the smart cards employed as subscriber identity modules, or SIM cards, is usually divided into parts according to the fact who has an access right to the data located in the memory: the memory is usually divided into three zones on the basis of the encryption class: an open, a confidential and a secret zone. On the confidential zone, such data is stored that, in order to be read and altered, requires a PIN identification number to be entered to the card. The memory of such a mobile equipment that is not connected to a subscriber identity module may also be divided into open, secret/confidential zones in the manner described above. In the confidential area of both the mobile equipment and of the SIM card, all user-specific data is stored, including protected subscriber identities, such as an IMSI=International Mobile Subscriber Identity in the GSM system and an ITSI=Individual Tetra Subscriber Identity in the TETRA system.

BRIEF DESCRIPTION OF THE INVENTION

It is an object of the present invention to provide a method that allows checking the identification number of a mobile subscriber and preventing an unauthorized use of a mobile equipment or a subscriber identity module, that is, a SIM card. It is an object of the invention to improve the safety of the network operator and the user and to protect them against unauthorized use of mobile equipments and of subscriber identity modules, and particularly against attempts to use them without permission.

The first embodiment of the invention is achieved with a method of the invention, which is characterized by releasing a protection of a protected subscriber identity, and thus finding out the identity of the subscriber; transmitting to the mobile communications system the subscriber identity in question and indication that the mobile equipment has been blocked.

The second embodiment of the invention relates to a method for checking the identification number of a subscriber in a mobile equipment employed in a mobile communications system, said mobile equipment being a combination of a subscriber station and an individual subscriber identity module containing a protected subscriber identity, said identity module being removably attached to the subscriber station, whereby a mobile equipment may be composed by attaching the subscriber identity module to any subscriber station, the method comprising the steps of: requesting the user of the mobile equipment the identification number of the subscriber, checking from the subscriber identity module the validity of the identification number entered by the user, repeating these steps provided that the user does not enter the valid identification number, and, when the number of requests and checks of the identification number exceeds a predetermined threshold value, blocking the subscriber identity module.

The second embodiment of the invention is characterized by releasing a protection of a protected subscriber identity, and thus finding out the subscriber identity; transmitting to the mobile communications system the subscriber identity in question and indication that the subscriber identity module has been blocked.

The first embodiment of the invention further relates to a mobile equipment comprising: memory means for storing the protected subscriber identity, a user interface for requesting the subscriber identification number from the user of the mobile equipment, checking means for checking the validity of the identification number (PIN) of the subscriber in question, a counter for counting the number of validity checks of the subscriber identification number, blocking means responsive to said counter for blocking the mobile equipment when the number of checks exceeds a predetermined number without the user of the mobile equipment having entered a valid identification number by means of said user interface.

The mobile equipment according to the first embodiment of the invention is characterized by comprising releasing means for releasing the protection of the protected subscriber identity and for finding out the subscriber identity, and transmission means for transmitting to the mobile communications system the found subscriber identity and an indication that the mobile equipment has been blocked.

The second embodiment of the invention relates to a mobile equipment comprising: a user interface for requesting the subscriber identity from the user of the mobile equipment, an individual subscriber identity module provided with a subscriber identity, said module being removably attached to said mobile equipment, further comprising checking means for checking the validity of the identification number of the subscriber in question, a counter for counting the number of validity checks of the subscriber identification number, blocking means responsive to said counter for blocking said subscriber identity module when the number of said checks exceeds a predetermined number without the user of the mobile equipment having entered a valid identification number.

The mobile equipment according to the second embodiment of the invention is characterized by further comprising releasing means for releasing the protection of the protected subscriber identity in the subscriber identity module and for finding out the subscriber identity, and transmission means for transmitting to the mobile communications system the found subscriber identity and an indication that the subscriber identity module has been blocked.

This application discloses a method that allows the mobile equipment to indicate to the system an information that an attempt is made at misusing the mobile equipment or a subscriber identity module, such as a SIM card, attached thereto. Misuse may refer to breaking the secret identification number of the SIM card or of the mobile user, for instance.

The invention is based on the idea that a mobile equipment or a subscriber identity module, that is, a SIM card releases the protection of a subscriber identity (IMSI, ITSI) when blocking itself as a result of invalid PIN codes. The SIM may thus communicate the subscriber identity (IMSI, ITSI) to the mobile equipment provided that it requests it subsequent to blocking of the SIM card. All the other information on the SIM card further remains protected. A mobile equipment/SIM card that operates in this manner may indicate towards the system the subscriber identity, the mobile equipment or SIM card corresponding to which was attempted to break by breaking the PIN identification number of the subscriber related to the mobile equipment or the SIM card in question.

The invention discloses how to indicate to the mobile communications system an attempt to break into a mobile equipment or a SIM card.

The advantage of such a method and a mobile equipment according to the invention is the fact that they solve problems related to safety of prior art mobile communications systems and mobile equipments.

Prior art courses of action are insufficient because an attempt to break into a mobile equipment or a subscriber identity module, such as a SIM card attached thereto is presumably not indicated to the system.

In networks designed for public safety, in particular, such as PMR and TETRA networks it would be most desirable that an attempt to break into a mobile equipment or a SIM card attached thereto would be indicated to the system. The mobile equipment and the method of the invention allow this, that is, they allow the mobile communications system to receive an information of some user attempting to break the mobile equipment or the subscriber identity module for his own, unauthorized use.

In accordance with the invention, when the mobile network receives the information on the attempt to break into the mobile equipment or the SIM card, the mobile network may thus try to block the mobile equipment or the subscriber identity module that has been attempted to break into so that they are no longer allowed to use the services of the network. In addition, the network operator or a supervisor or a duty officer of a smaller user group may be provided with the data related to the object of the breaking attempt, and they may take the required steps for preventing the unauthorized use.

BRIEF DESCRIPTION OF THE DRAWINGS

In the following, the invention will be disclosed in greater detail with reference to the attached drawings, in which.

DETAILED DESCRIPTION OF THE INVENTION

Figure 1:
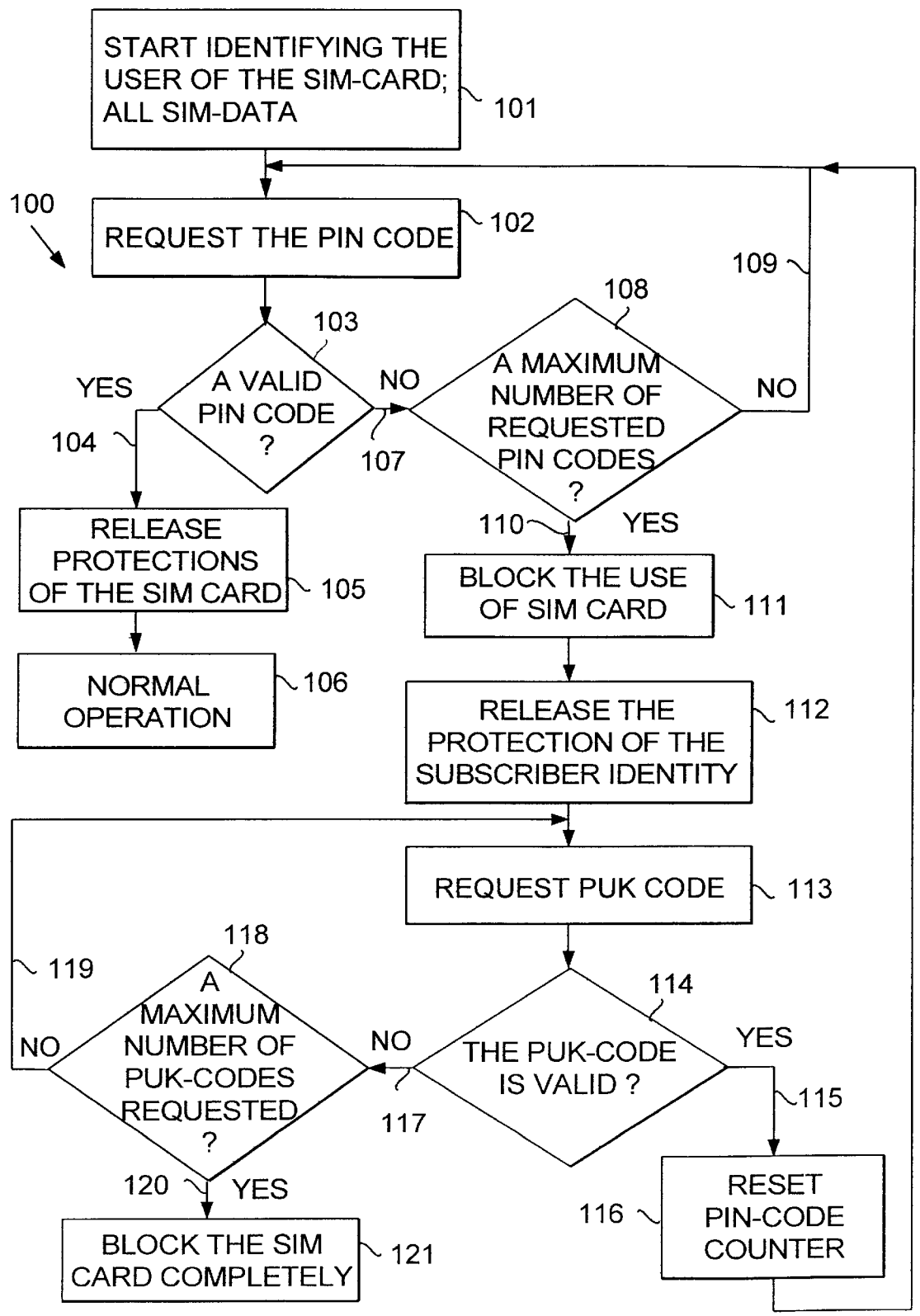
FIG. 1 is a flow diagram illustrating the operation of a subscriber identity module according to a second embodiment of the invention.

The invention is based on the idea that a mobile equipment may unblock an encrypted subscriber identity located in its memory or on a SIM card attached to the mobile equipment if the SIM card has blocked itself as a result of entered invalid PIN codes. FIG. 1 shows the operation of the method from the point of view of the SIM card, and FIG. 2 from the point of view of the mobile equipment. After receiving the subscriber identity from the SIM, the mobile equipment transmits an information of the attempt, along with the subscriber identity, to the system.

The operation of the first embodiment of the invention must be understood by means of a description of the operation of the second embodiment of the invention. Thus, requesting and checking the subscriber-specific PIN code (password) associated with the subscriber identity module of the second embodiment corresponds to checking the subscriber identification number according to the first embodiment.

FIG. 1 is a flow chart of the operation of the subscriber identity module according to the second embodiment of the invention. In step 101 the subscriber identity module, hereinafter referred to as a SIM card, starts to identify its user. This is carried out in step 102 by requesting the user of the card or, according to the first embodiment of the invention, the user of the mobile equipment an individual PIN code of a subscriber connected to the mobile equipment or the subscriber identity module, respectively. Once the code has been obtained, the validity of the PIN code is checked in step 103. Provided that the PIN code provided by the user is valid 104, the protections of the SIM card, that is, the confidential memory zone of the SIM card, are released. Correspondingly, in the first embodiment of the invention, it would be possible to release the confidential zone of the memory of the mobile equipment. Subsequently, the operation of the mobile equipment and of the SIM card continues as usual.

If, in turn, it is detected in step 103 that the PIN code entered to the mobile equipment is invalid 107, it is checked 108 how many times an invalid PIN code has already been entered into the mobile equipment. Provided that the number of invalid PIN codes is smaller 109 than a predetermined threshold value, the operation of the mobile equipment/SIM card returns to step 102, where the PIN code is requested again from the user of the mobile equipment.

If, in turn, it is detected in the check in step 108 that the maximum number of PIN codes has already been requested 110, the use of the SIM card or, in the second embodiment of the invention, of the mobile equipment is blocked 111. Thereafter, the user can no longer use the SIM card or the mobile equipment without the valid PUK code of the SIM card in question being entered into the card or the mobile equipment. Following this, the protection of the subscriber identity code located on the SIM card or in the memory of the mobile equipment is released, that is, the protection of the IMSI or ITSI identity is released so as to find out the identity. In the second embodiment of the invention, this identity is then first transmitted to the mobile equipment, which, as in the first embodiment of the invention, transmits to the mobile network said identity and the indication that an attempt has been made to break the PIN code e.g. in a registration message. Of course, the indication can be transmitted to the network in all other messages. The network is thus informed that an attempt has been made to break the PIN code of the mobile equipment or the SIM card, whereby the network or the operator may conclude that the subscriber identification number in question is associated with a user who is attempting at misusing the network and the user in question may thus be blocked outside the network.

Following this in step 113 the PUK code is requested from the mobile user. Thereafter, it is checked in step 114 whether the entered PUK code is valid. In case the entered PUK code is valid 115, a PIN code counter is reset 116, whereby the user may again feed a predetermined number of 'invalid' PIN identification numbers without the operation of the SIM card or the mobile equipment being blocked. In other words, the procedure returns to step 102, in which the PIN code is requested from the user.

If, in turn, the user enters an invalid PUK code 117, it is checked 118 from the following counter whether a maximum number of invalid PUK codes has been entered into the mobile equipment or the SIM card. In case the maximum number has not yet been exceeded 119, the procedure returns to step 113, where the PUK code is requested again from the user. If, again, the maximum number is exceeded 120, the SIM card or the mobile equipment is completely blocked 121.

Figure 2:
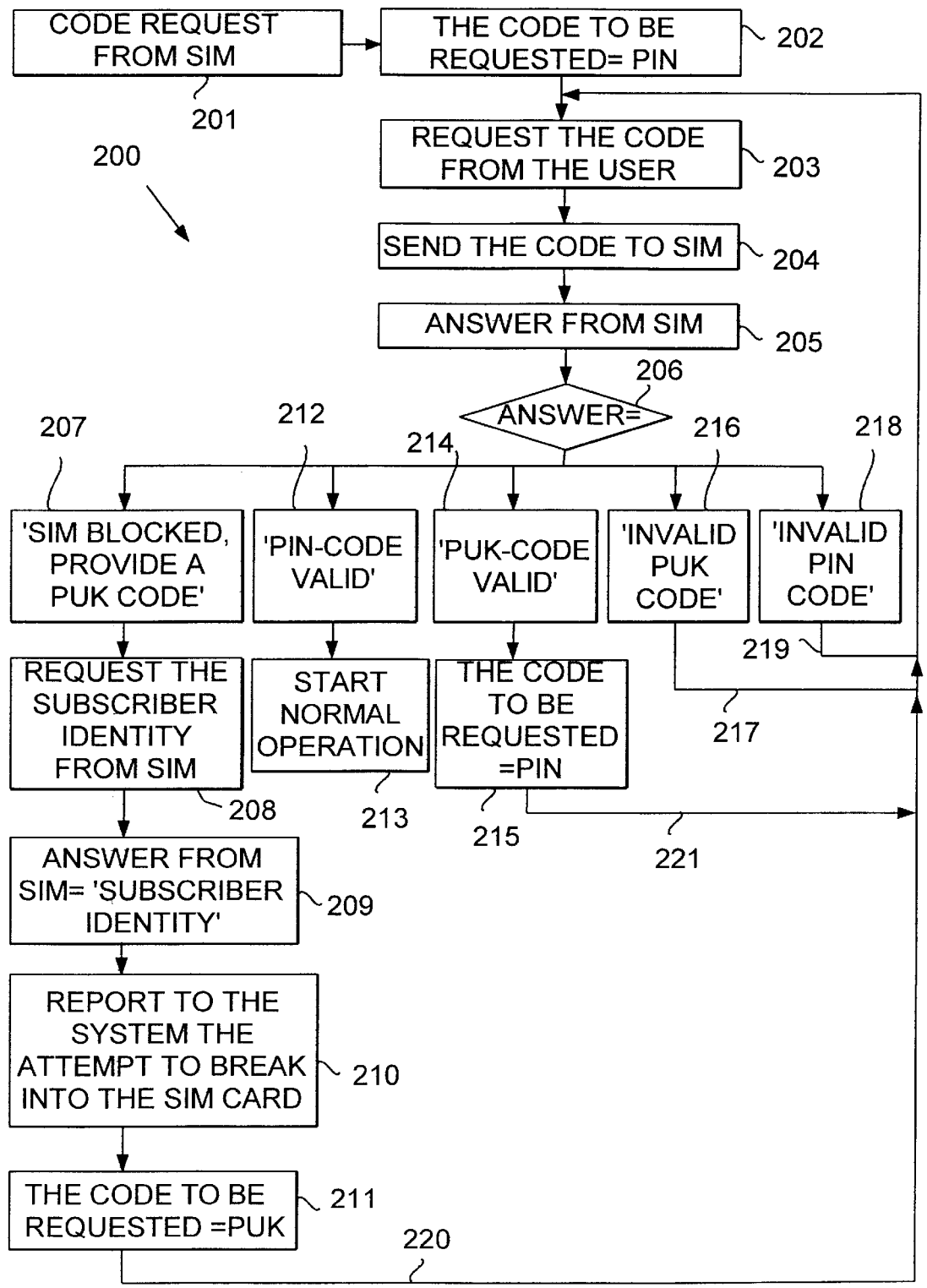
FIG. 2 is a flow diagram illustrating the operation of a mobile equipment according to the second embodiment of the invention.

FIG. 2 shows a flow chart of the operation of the second embodiment of the invention. The operation of the method starts from step 201, where the mobile equipment receives from a subscriber identity module, such as a SIM card attached thereto a request to ask for the PIN identification number from the user of the mobile equipment. This is an example of the operation in accordance with the second embodiment of the invention. In the solution according to the first embodiment of the invention, no SIM card is attached to the mobile equipment, but it carries out requesting the identification number of the subscriber and checking the validity, and the following operation independently. After receiving a request 201 from the SIM card, the mobile equipment concludes 202 that the code requested is a PIN code. Thereafter the mobile equipment requests 203 the code in question from its user via its user interface. The mobile equipment receives the PIN code by means of its user interface and transmits it 204 to the SIM card according to the second embodiment of the invention. This subscriber identity module thus carries out checking the PIN code in the manner described above in step 103 of FIG. 1 and returns 205 an answer to the mobile equipment, which analyses 206 the meaning of the answer. In the solution according to the first embodiment of the invention, checking the PIN code and measures caused by it may of course be carried out in the actual mobile equipment.

The mobile equipment acts as follows on the basis of the analysis of the information/answer transmitted by the SIM card:

In case the SIM card has provided 207 information that the SIM card is blocked and that the user of the mobile equipment is requested to enter a PUK code, the mobile equipment requests 208, according to the invention, the subscriber identity, that is, an IMSI or ITSI identity from the SIM card. The SIM card thus releases the protection of these identities in its own memory and transmits 209 a subscriber identity (IMSI, ITSI) to the mobile equipment. According to the first embodiment of the invention, the aforementioned releasing the protection of the subscriber identity would be carried out in the mobile equipment, in which the subscriber identity would be stored, as well. Following this, in step 210, the mobile equipment informs the mobile communication system according to the invention that an attempt has been made to break into the SIM card (the second embodiment) or the mobile equipment (the first embodiment) and that the SIM card (or mobile equipment) in question has been blocked. The mobile equipment may thus act as follows:

The mobile communications system may temporarily disable the radio unit or the mobile equipment in which the SIM card has been attempted to use ('temporary disabling'). The radio unit in question thus cannot be used for communication, but the system may monitor the location of the radio unit in the network.

The system may also permanently disable the radio unit ('permanent disabling').

The access of the subscriber to whom the blocked SIM card belongs is prevented from this on. This is done by labelling the subscriber in question as a 'forbidden subscriber' in the databases of the system, in which case the operation of this subscriber in the network is restricted e.g. so that the calls of the subscriber are not allowed or some services are closed.

Since after blocking the SIM card, the subscriber identity on the card may also be read by the person who has made the attempt on misuse, the subscriber must usually be labelled as a 'forbidden subscriber' in each case. It must be noted, however, that although the subscriber identity would not be marked as forbidden, it is not possible to be authenticated in the system using this identity because the authentication key required for authentication is not available due to blocking the card.

In accordance with the invention, the attempt at misusing the card is further reported to persons supervising the use of the mobile communications system or e.g. to a duty officer or a dispatcher of a 'public safety' network. The person supervising the use of the system may thereafter contact the legitimate owner of the SIM card and inquire whether the card has possibly come into the wrong hands.

Subsequently, the implementation of the invention continues from step 211, in which the following code requested by the mobile equipment and the SIM card is the PUK code, which must be entered correctly by the user in order that the PIN code can be requested again from the user and that the SIM card and the mobile equipment can be returned to use provided that the user enters the valid PIN code. Thereafter, the procedure returns 220 to step 203, in which the code is requested from the user.

If, again, it is detected in step 206 that the answer obtained from the SIM card or the observation made by the mobile equipment (in the first embodiment) indicates that the user has entered a valid PIN code 212, the mobile equipment starts its operation as usual.

If, again, it is detected in step 206 that the answer obtained from the SIM card or the observation of the mobile equipment (in the first embodiment) indicates that the user has entered a valid PUK code 214, the operation continues so that the user interface of the mobile equipment is reported 215 that the following piece of information requested from the user is the PIN code, which, when entered correctly, allows the user to activate the mobile equipment. The procedure thus returns 221 to step 203, in which the code is requested from the user.

If, again, it is detected in step 206 that the answer obtained from the SIM card or the observation made by the mobile equipment (in the first embodiment) indicates that the user has entered an invalid PUK code 216, the procedure shifts 217 to step 203, in which the PUK code is requested again.

If, again, it is detected in step 206 that the answer obtained from the SIM card or the observation of the mobile equipment (in the first embodiment) indicates that the user has entered an invalid PIN code 218, the procedure shifts 219 to step 203, in which the PIN code is requested again.

Figure 3:
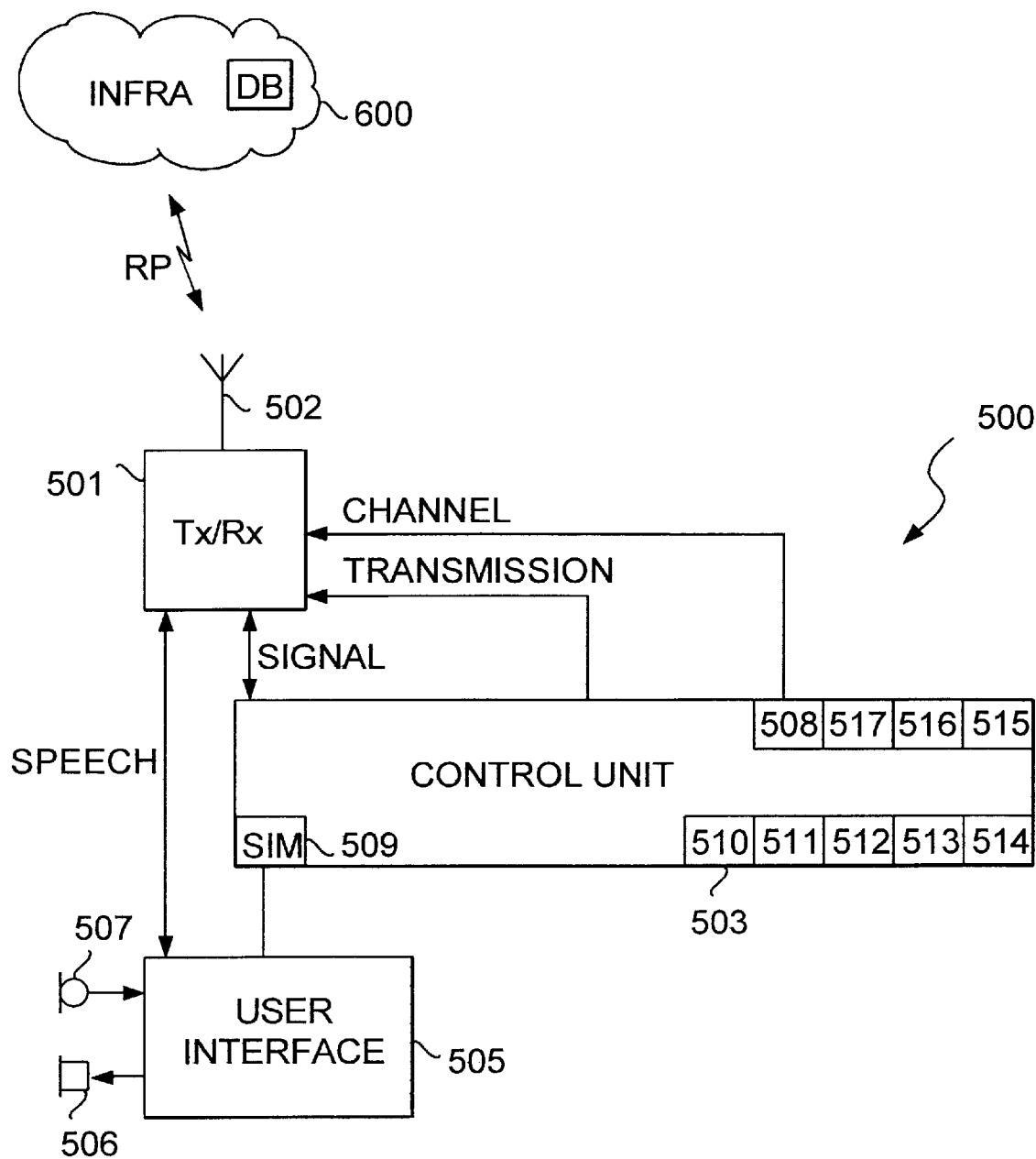
FIG. 3 is a block diagram illustrating the mobile equipment of the invention.

FIG. 3 shows a block diagram of a radio unit according to the invention. The figure shows the infrastructure (INFRA) of the mobile communications system 600. The network infrastructure comprises e.g. base stations, switching centres, databases DB and other telecommunications equipments. The figure shows a typical radio unit 500, that is, a radio telephone, mobile equipment or a subscriber station used by the subscriber communicating in a mobile communications system. The purpose of a transceiver (TX/RX) 501 is to be adapted to a radio channel employed at each moment, the mobile equipment communicating via said radio channel with the network infrastructure. The transceiver 501 is connected to an antenna 502, which is connected to the radio path RP. Usually, radio frequencies between 60–1000 MHz (VHF and UHF frequency ranges) are employed although other frequencies may be employed, as well. On the radio path RP, analog or digital modulation may be employed.

A user interface 505 comprises electroacoustic converter means, typically an earpiece 506 and a microphone 507 and possibly keys associated with starting, ending and dialling a call. Mobile equipments employed in trunking systems may also comprise a push-to-talk button which must be pressed down during a speech turn.

The purpose of a control unit 503 is to control the operation of the radio unit. The control unit 503 is connected to the user interface 505, which provides it e.g. with impulses associated with starting and ending a call. Via the user interface 505, the control unit 503 may also give the user sound signals or visual signals associated with the operation of the radio telephone and/or the radio telephone system.

The control unit 503 is connected to the transceiver TX/RX 501. The channel employed by the transceiver is determined by the control unit 503, that is, the transceiver 501 is tuned onto the channel, i.e. the radio frequency, determined by the control unit 503, and into a suitable time-slot. The transceiver 501 is also switched on under control of the control unit 503. The control unit 503 receives and transmits signalling messages via the transceiver 501.

The mobile equipment or the radio unit 500 according to the invention may be employed e.g. in a radio system comprising a radio network comprising at least one base station and subscriber stations and possibly one or more repeater stations and databases DB. Said radio unit thus comprises a transceiver unit 501 for receiving transmissions transmitted by other radio units or base stations, and for transmitting transmissions to said other radio units or base stations, a control unit 503 for controlling the operation of the radio unit and a user interface 505.

A mobile equipment 500 according to the first embodiment of the invention comprises memory means 508 for storing a protected subscriber identity IMSI or ITSI, a user interface 505 for requesting the subscriber identification number PIN from the user of the mobile equipment, checking means 510 for checking the validity of said subscriber identification number PIN, counter 511 for counting the number of validity checks of the subscriber identification number PIN, and blocking means 512 responsive to said counter 511 for blocking the mobile equipment when the number of said checks exceeds a predetermined number without the user of the mobile equipment having entered a valid identification number PIN by means of said user interface 505.

The mobile equipment 500 of the invention further comprises releasing means 513 for releasing the protection of the protected subscriber identity in the subscriber identity module and for finding out the subscriber identity, and transmission means 514 for transmitting to the mobile communications system 600 the found subscriber identity and an indication that the mobile equipment has been blocked.

In the mobile equipment of the invention, releasing 513 the protection of the protected subscriber identity is carried out after blocking the mobile equipment 500 (see step 11, FIG. 1).

In the mobile equipment 500 of the invention, said subscriber identity IMSI or ITSI and the indication that the mobile equipment 500 has been blocked are transmitted to the mobile communications system e.g. in a registration message.

A mobile equipment according to the second embodiment of the invention comprises a user interface 505 for requesting the subscriber identification number PIN from the user of the mobile equipment, a subscriber specific subscriber identity module SIM, 509 provided with a subscriber identity, which is removably attached to said mobile equipment.

A mobile equipment according to the second embodiment of the invention further comprises checking means 510 for checking the validity of said subscriber identification number PIN, counter 511 for counting the number of validity checks of the subscriber identification number PIN, and blocking means 515 responsive to said counter 511 for blocking the subscriber identity module when the number of said checks exceeds a predetermined number without the user of the mobile equipment 500 having entered a valid identification number PIN.

The mobile equipment of the invention further comprises releasing means 516 for releasing the protection of the protected subscriber identity IMSI, ITSI in the subscriber identity module SIM, 509, and for finding out the subscriber identity, and transmission means 517 for transmitting to the mobile communications system the found subscriber identity and an indication that the subscriber identity module has been blocked.

In the mobile equipment of the invention, releasing 112 the protection of the protected subscriber identity is carried out after blocking 111 said subscriber identity module SIM, 509.

In the mobile equipment of the invention, said subscriber identity IMSI or ITSI and the indication that the subscriber identity module SIM, 509 has been blocked (step 111, FIG. 1) are transmitted to the mobile communications system e.g. in a registration message.

The figures and the explanation associated therewith are only intended to illustrate the present invention. In detail, the method and the mobile equipment of the invention may vary within the scope of the attached claims.

The aforementioned operation in which the mobile equipment informs the mobile communications system of an attempt to break the protection of a PIN code of a subscriber identity module, that is, of a SIM-card, may be implemented in two alternative manners:

(1) the subscriber identity IMSI, ITSI may be stored in such a manner that the PIN code protection does not apply to it. The subscriber identity may thus be read from the card in every case regardless of whether a PIN code has been entered or not and whether the card has blocked itself or not. Or alternatively:

(2) the subscriber identity has been stored in such a manner that the identity may be read in two cases only:
   a) when a valid PIN code has been entered, and
   b) when the card has been blocked as a result of entering invalid PIN codes.

In case b) it is not possible to read other information from the card, except for the subscriber identity.

The implementation according to alternative (2) shown above is more functional because in that case the subscriber identity can be read without a valid PIN code in such a case only where the card is blocked and it is thus not possible for the subscriber identity to come into the hands of an unauthorized user by mistake.

We claim:

1. A mobile equipment, said mobile equipment being a combination of a subscriber station and an individual subscriber identity module containing a protected subscriber identity, said individual subscriber identity module being removably attached to the subscriber station, whereby a mobile equipment may be composed by attaching the subscriber identity module to any subscriber station, the mobile equipment comprising:

a user interface for requesting a personal identification number of a subscriber from the user of the mobile equipment, checking means for checking the validity of said personal identification number of the subscriber, a counter for counting the number of validity checks of the personal identification number of the subscriber, blocking means responsive to said counter for blocking the subscriber identity module when the number of said validity checks exceeds a predetermined number without the user of the mobile equipment having entered a valid personal identification number, releasing means responsive to said blocking means for releasing the protection of the protected subscriber identity in the subscriber identity module after the blocking of the subscriber identity module, means for requesting the released subscriber identity from the subscriber identity module, means for sending the released subscriber identity from the subscriber identity module to the subscriber station, and transmission means for transmitting to the mobile communications system the released subscriber identity and an indication that the subscriber identity module has been blocked.

2. A mobile equipment as claimed in claim 1, wherein said transmission means being arranged to transmit said subscriber identity and said indication that subscriber identity module has been blocked to the mobile communications system in a registration message.

3. A method for checking a personal identification number of a subscriber in a mobile equipment employed in a mobile communications system, said mobile equipment being a combination of a subscriber station and an individual subscriber identity module containing a protected subscriber identity, said individual subscriber identity module being removably attached to the subscriber station, whereby a mobile equipment may be composed by attaching the subscriber identity module to any subscriber station, the method comprising the steps of:

requesting the user of the mobile equipment the personal identification number of the subscriber, checking from the subscriber identity module the validity of the personal identification number entered by the user, repeating these stops provided that the user does not enter the valid personal identification number, blocking the subscriber identity module when the number of requests and checks of the personal identification number exceeds a predetermined threshold value, releasing a protection of the protected subscriber identity in the subscriber identity module after said blocking of the subscriber identity module, requesting by the subscriber station the released subscriber identity from the subscriber identity module, p1 sending by the subscriber identity module to the subscriber station the released subscriber identity, transmitting to the mobile communications system said subscriber identity and an indication that the subscriber identity module has been blocked.

4. A method as claimed in claim 3, wherein said step at transmitting is performed by transmitting said subscriber identity and said indication that the subscriber identity module has been blocked to the mobile communication system in a registration message.

5. A method as claimed in claim 3, comprising the step of labelling said subscriber identity as forbidden in a database of the mobile communications system in response to said subscriber identity and said indication that subscriber identity module has been blocked, transmitted to the mobile communications system.

6. A method as claimed in claim 5, comprising the step of said subscriber identity being no longer valid for employing the services of the mobile communications system in response to said labelling of said subscriber identity as forbidden in the database of the mobile communication system.

7. A method as claimed in claim 5, comprising the step of said subscriber identity being no longer valid for employing the services of the mobile communications system, and the mobile communications system yet maintaining information on the location of said mobile equipment and/or subscriber identity module, in response to labelling said subscriber identity as forbidden in the database of the mobile communications system.

8. A method as claimed in claim 5, comprising the step of reporting said subscriber identity and the attempt of misusing said personal identification number of the subscriber to the operator of the mobile communication system in response to said labelling of said subscriber identity as forbidden in the database of the mobile communications system.

9. A method as claimed in claim 5, comprising the step of reporting said subscriber identity, subscriber data related to said subscriber and the attempt of misusing said subscriber identification number to the operator of the mobile communications system in response to labelling said subscriber identity as forbidden in the database of the mobile communications system.

10. A method as claimed in claim 5, comprising the step of reporting the attempt of misusing the subscriber identity module and/or the personal identification number of the subscriber to the legitimate owner of the subscriber identity module and/or the personal identification number of the subscriber in response to said labelling of said subscriber identity as forbidden in the database of the mobile communications system.

* * * * *